Feb. 12, 1924.

G. A. UNGAR 1,483,561

FLEXIBLE COUPLING

Filed Dec. 11, 1919     2 Sheets-Sheet 1

INVENTOR
G. A. Ungar
BY
Duell, Warfield & Duell
ATTORNEY

Patented Feb. 12, 1924.

1,483,561

UNITED STATES PATENT OFFICE.

GUSTAVE A. UNGAR, OF PELHAM MANOR, NEW YORK, ASSIGNOR TO F. R. BLAIR & CO., INC., OF NEW YORK, N. Y., A CORPORATION OF NEW YORK.

FLEXIBLE COUPLING.

Application filed December 11, 1919. Serial No. 344,030.

*To all whom it may concern:*

Be it known that I, GUSTAVE A. UNGAR, a citizen of the United States, residing at Pelham Manor, in the county of Westchester and State of New York, have invented certain new and useful Improvements in Flexible Couplings, of which the following is a full, clear, and exact description, such as will enable others skilled in the art to which it appertains to make and use the same.

This invention relates to machine elements for transmission of torque, and with respect to its more specific features to couplings embodying a rotary driving member, a rotary driven member, and a flexible element or elements coupling the driving and the driven member to transmit rotary motion from one to the other and permit lateral displacement of the axis of the driving and driven members, as, for instance, the assumption of an angular relation between said axes during the transmission of power. In its more particular features the invention relates to machine elements of the character above referred to wherein the flexible torque transmitting coupling element is of a fibrous nature as, for instance, cotton, leather or rubber, either alone or associated with each other, and preferably embodied in flexible disks, strips or links, as more particularly pointed out hereinafter.

One of the objects of the present invention is the provision of a practical flexible coupling of the character referred to, more especially intended for heavy duty and involving a flexible torque transmitting element of great tensile strength.

Another object is the provision of a simple but highly efficient device for effecting the gripping of such a heavy duty tensile element to the driving and driven members.

Another object is the provision of a practical heavy duty flexible element designed to withstand high tensile working stresses effectively.

Other objects will be in part obvious and in part pointed out hereinafter.

The invention accordingly consists in the features of construction, combinations of elements and arrangement of parts, which will be exemplified in the construction hereinafter described and the scope of the application of which will be indicated in the following claims.

In the accompanying drawings forming part of this specification, and wherein similar reference characters refer to similar parts throughout the several views—

Figure 1:
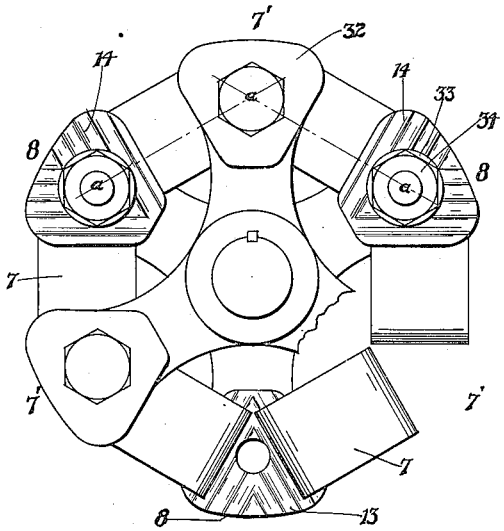
Figure 1 is an end elevation of a portion of a coupling embodying the invention.

In the drawing the numerals 1 and 2 indicate rotatable driving and driven shafts connected by a flexible joint which is designed to transmit torque from one shaft to the other and to permit displacement of the axes of the two shafts angularly relative to each other while in operation. The device finds a special utility, in the transmission mechanism of automobiles. The numerals 3 and 4 indicate hubs of spiders fixed to rotate with shafts 1 and 2, and spider arms 5 and 6 extending from these hubs provide elements to which the intermediate flexible element or disk 7 is clamped. In the present embodiment each hub has three of said arms so as to provide a pair of spiders, and the arms of one shaft are connected to the disk at points 7', 7', 7', alternating with those 8, 8, 8, at which the arms of the other shaft are connected thereto, around the axis of rotation and at some distance radially from the axis. In the present embodiment the clamping devices for all the arms are similar and a description of one will suffice for all.

Figure 3:
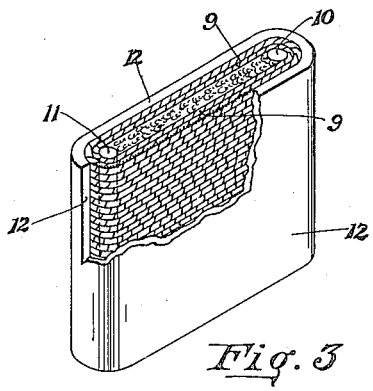
Fig. 3 is a perspective detail view of one of the links of Fig. 1.
Figure 4:
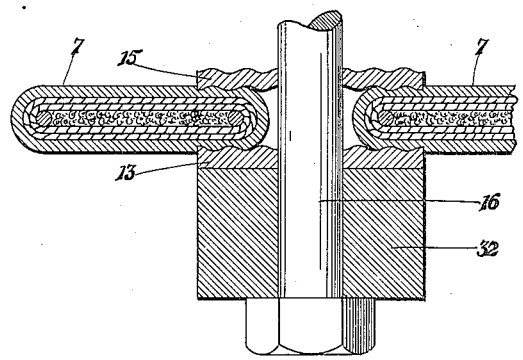
Fig. 4 is a detail, in horizontal section, of a portion of one of the clamping jaws.

In the present embodiment the flexible elements or links connecting the arms of one spider to those of the other involve relatively heavy strands or threads such as would be provided by, for instance, linen cord. In the form illustrated in Fig. 3, the numeral 9 indicates a cord which is wound or coiled around the outside of certain reinforcing clamping jaws or wires 10 and 11 at each end of the link to be produced. The cord is wound continuously in a generally spiral manner around the two spaced wires 10 and 11 from one end to the other so as to progressively cover more or less of the whole of the wires and produce a flat cord-loop or link, the ends of the cord being fastened in any suitable way. Between the two wires 10 and 11 the cord-loop may be filled so as to form a compact link. This filling material may be pieces of pure rubber or woven fabric. Furthermore the link may be encased in a strong wrapper 12, as cloth, leather, or other suitable material.

Figure 2:
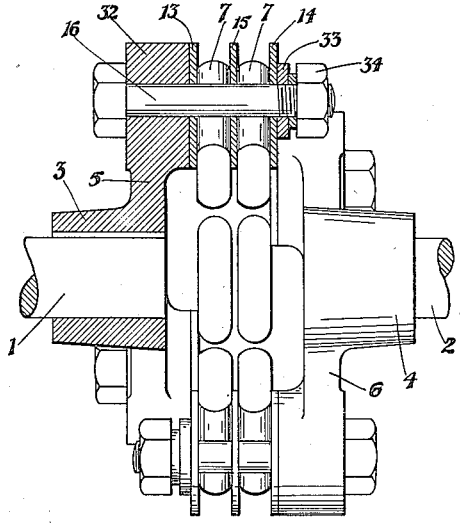
Fig. 2 is a side elevation.

It is to be understood that the flexible element 7, of Figs. 1 and 2, is made up of the cord-loops or links referred to, one or more of such cord-loops being connected to respective spider arms so as to transmit the torque through the links. In the embodiment illustrated in Figs. 1 and 2, twelve cord-loops are illustrated, two for each connection.

To make the cord-loops the wires 10 and 11 may be held apart the proper distance, and the cord wrapped continuously therearound, as stated, the wires thus serving as holding members for the formation of the loops. When these wires are retained as a part of the coupling, they serve as clamping jaws, or pieces, within each loop, which reinforce the loops at their opposite ends, and which are covered by the cords and thus embedded in the loops.

Figure 5:
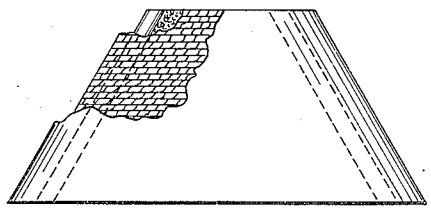
Figs. 5 and 6 are detail diagrammatic views of modified links.

In order to clamp these cord links to a spider arm, they may be arranged as shown in Figs. 1 and 2, where the adjacent ends of two links are illustrated as being gripped between the clamping jaws 13 and 14 and spacing plate 15, hereinafter referred to, the bolt 16 passing between two adjacent links at each spider arm. If desired, the holding wires may be generally radially arranged, as illustrated in Fig. 5.

In addition to the high tensile strength resulting from the cord-loop above described, the wires provide a hard or relatively hard spot with which a corrugation of one of the clamping jaws may cooperate to firmly grip the loop.

Figure 7:
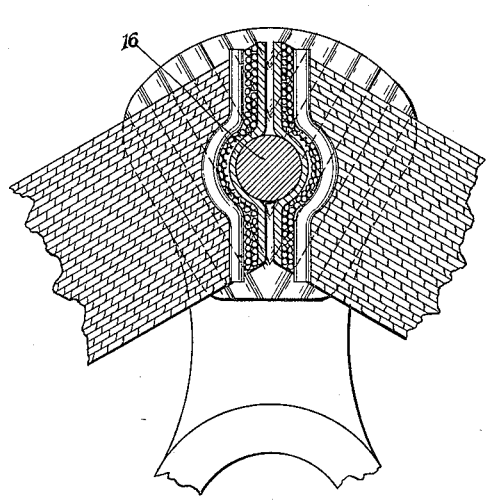
Figs. 7 and 8 illustrate different modifications of the reinforcing clamping jaws, or wires, which are parts of the links.

If desired, the wires at the ends of circumferentially adjacent links may be bent or offset in opposite directions before being wrapped with the cord, thereby providing a recess, or a space, between two adjacent links for the reception of the bolts or pins 16, as illustrated in Fig. 7.

Figure 8:
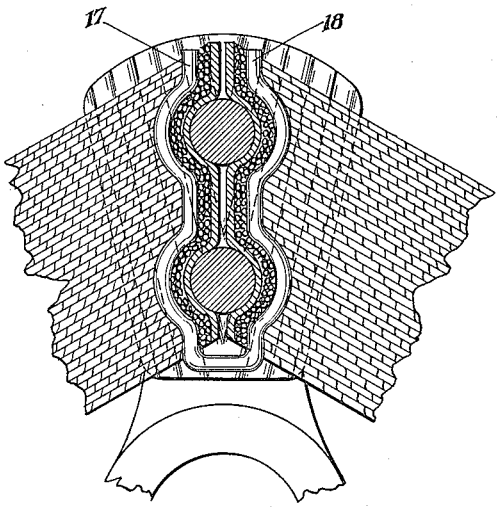

Or instead of making the adjacent wires separate, as in Fig. 7, the wires at the ends of two adjacent links may be made from an integral piece bent to provide two legs 17 and 18, one of which will provide a reinforcing wire for one link and the other provide a reinforcing wire for the adjacent link, as illustrated in Fig. 8. Also, there is illustrated in this figure a two bolt construction; the links referred to being bent to accommodate the passage of the two bolts.

Figure 9:
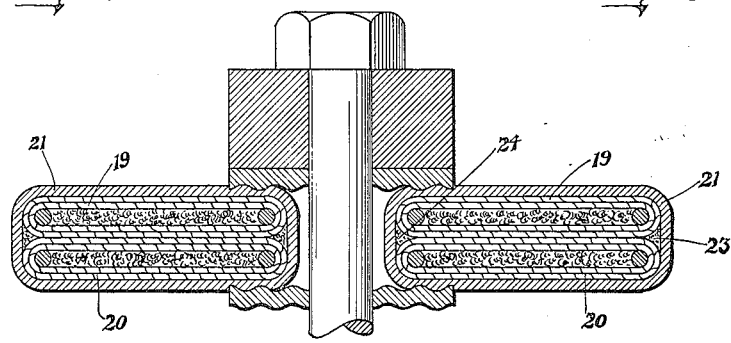
Figs. 9 and 10 illustrate certain different forms of link embodying the invention.

In the form shown in Fig. 9 the cord links are made multiple ply by superposing two cord links 19 and 20 of the construction hereinbefore described, and encasing them in a single wrapper 21, the wrapper being filled at the points 23 and 24 if desired.

Figure 10:
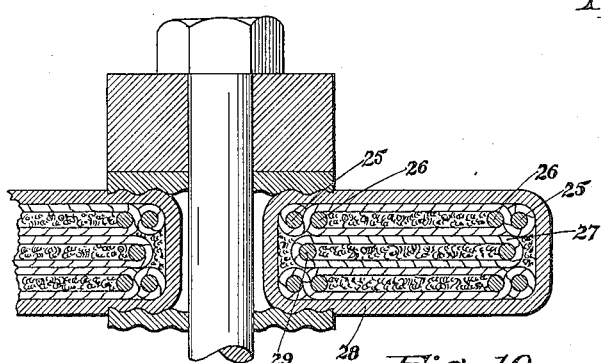

In the form shown in Fig. 10 some of the links are made with two holding wires 25 and 26 located at each end of each link, the cords crossing each other at each end between the two wires and are associated with a two wire link 27 and the whole encased in a single wrapper 28 properly filled, the wire 29 of the intermediate link coming between the two wires of the outer links. In this way each end of a complete cord-loop is provided with a number of local spots, or reinforced points, for engagement with the corrugations of the clamping jaws.

Figure 6:
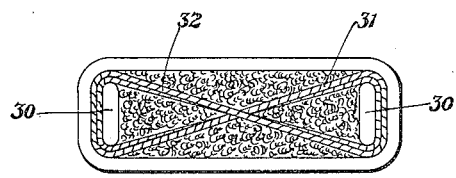

Instead of continuously wrapping the cords in the same direction around two or more holding wires, the cords may be crossed between the ends of each loop and between the two end holding wires, as illustrated in Fig. 6. In such instance, the cross-dimension of the wire might be increased as shown at 30, and filling introduced in the sub-loops 31 and 32 and between the loops and the wrapper, the whole being encased in a single wrapper as previously explained.

For clamping the cord-loops or links to the spiders, any efficient arrangement of clamping jaws may be used. In the embodiment illustrated for the purpose, the spider arm clamping jaw 32 has the face plate 13, strung on the bolt 16, as is the clamping jaw 14 and the spacing plate 15. The clamping jaws, including the spacing plates, are illustrated as corrugated generally radially of the axis of rotation of the coupling, so as to firmly grip the cord links by pressure exerted transversely against the cord loops. The wires in the several forms illustrated serve to reinforce the links and provide a hard backing between which and the clamping jaws, the softer material of the links may be effectively held. If desired the pattern of the teeth, or corrugations, of the clamping jaws may harmonize with the contour of the wires. The clamping jaw 14 is preferably of rigid effect, and may be reinforced by a rigid washer 33 extending over the area of the cord link within the grip of the jaw 14. In this wise the setting up of the nuts 34 will result in positively clamping the cord links to the spider arms. The several links including the cord-loops are herein illustrated as separate elements, but it is to be understood that a plurality of such links may be arranged in polygonal form and covered with a layer or layers of fabric and the whole vulcanized together, so as to be applied and removed from the spiders as a single disk, as it were.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent, is:—

1. A device of the character described comprising, in combination, a driving member and a driven member, each comprising a spider having arms, and means, for attaching a flexible torque transmitting element to said arms with the arms of one spider alternating with those of the other around the axis of rotation, said flexible element including spirally wound cord-loop links connecting the arms of one spider with those of the other, the cords of a loop crossing each other between the ends of such loop.

2. A device of the character described comprising, in combination, a driving member and a driven member, each comprising a spider having arms, and means, for attaching a flexible torque transmitting element to said arms with the arms of one spider alternating with those of the other around the axis of rotation, said flexible element including spirally wound cord-loop links connecting the arms of one spider with those of the other, the cords of a loop crossing each other at each end of such loop between the ends of such loop.

3. A device of the character described comprising, in combination, a driving member and a driven member, each comprising a spider having arms, and means, for attaching a flexible torque transmitting element to said arms with the arms of one spider alternating with those of the other around the axis of rotation, said flexible element including spirally wound cord-loop links connecting the arms of one spider with those of the other, the cords of a loop crossing each other between the ends of such loop, and filling material within the sub-loops formed by the crossed cords.

4. A device of the character described comprising, in combination, a driving member and a driven member, each comprising a spider having arms, and means, for attaching a flexible torque transmitting element to said arms with the arms of one spider alternating with those of the other around the axis of rotation, said flexible element including cord-loop links connecting the arms of one spider with those of the other, and loop reinforcing clamping wires at the opposite ends of and within each loop.

5. A device of the character described comprising, in combination, a driving member and a driven member, each comprising a spider having arms, means for attaching a flexible torque transmitting element to said arms with the arms of one spider alternating with those of the other around the axis of rotation, including movable clamping jaws having teeth, the lengths of which are adapted to lie transversely of the line of torque strain, and pins on which said jaws are strung, said flexible element including cord-loops connecting the arms of one spider with those of the other.

6. A device of the character described comprising, in combination, a driving member and a driven member, each comprising a spider having arms, means, for attaching a flexible torque transmitting element to said arms with the arms of one spider alternating with those of the other around the axis of rotation, including movable clamping jaws having teeth, the lengths of which are adapted to lie transversely of the line of torque strain, and pins on which said jaws are strung, said flexible element including cord-loops connecting the arms of one spider with those of the other, and loop reinforcing clamping wires at the opposite ends of and within each loop, end wires of circumferentially adjacent loops being offset in opposite directions for reception of said pins therebetween.

7. A device of the character described comprising, in combination, a driving member and a driven member, each comprising a spider having arms, means for attaching a flexible torque transmitting element to said arms with the arms of one spider alternating with those of the other around the axis of rotation, including movable clamping jaws having teeth, the lengths of which are adapted to lie transversely of the line of torque strain, and pins on which said jaws are strung, said flexible element including cord-loops connecting the arms of one spider with those of the other, and loop reinforcing clamping wires at the opposite ends of and within each loop, end wires of circumferentially adjacent loops being integral.

8. A device of the character described comprising, in combination, a driving member and a driven member, each comprising a spider having arms, means, for attaching a flexible torque transmitting element to said arms with the arms of one spider alternating with those of the other around the axis of rotation, including movable clamping jaws having teeth, the lengths of which are adapted to lie transversely of the line of torque strain, and pins on which said jaws are strung, said flexible element including cord-loops connecting the arms of one spider with those of the other, and loop reinforcing clamping wires at the opposite ends of and within each loop, portions of said wires being adapted to register with the spaces between said teeth.

9. A device of the character described comprising, in combination, a driving member and a driven member, each comprising a spider having arms, means, for attaching a flexible torque transmitting element to said arms with the arms of one spider alternating with those of the other around the axis of rotation, said flexible element including cord-loop links connecting the arms of one spider with those of the other, loop reinforcing clamping members within the loops, and filling material within the loops between said reinforcing jaws.

10. A device of the character described comprising, in combination, a driving member and a driven member, each comprising a spider having arms, means, for attaching a flexible torque transmitting element to said arms with the arms of one spider alternating with those of the other around the axis of rotation, said flexible element including cord-loop links connecting the arms of one spider with those of the other, loop reinforcing clamping wires at the opposite ends of and within each loop, filling material within the loops, and a wrapper for each link.

11. A torque transmitting flexible element comprising in combination, a plurality of wires spaced apart, and a cord wound around the outside of said wires and progressively covering their lengths to form a loop with the wires at the ends thereof.

12. A torque transmitting flexible element comprising, in combination, a plurality of wires spaced apart, and a cord wound around the outside of said wires and progressively covering their lengths and crossing between the wires to form a loop with the wires at the ends thereof.

13. A link for the transmission of power between arms of rotatable spiders which comprises reinforcing spaced wires, a cord spirally wound thereabout and forming a plurality of adjoining loops, and means to bind said loops together in a unitary structure.

14. A link for the transmission of power between arms of rotatable spiders which comprises reinforcing spaced wires, a cord spirally wound thereabout forming a plurality of loops in a unitary structure and adapted to be clamped at the ends onto said arms by pressure exerted transversely of said loops.

15. A link for the transmission of power between arms of rotatable spiders which comprises spaced reinforcing wires, a cord spirally wound thereabout to form a plurality of loops in a unitary structure, filling material positioned within said loops between said wires, said structure being adapted to be clamped at the ends onto said arms by pressure exerted transversely of said loops.

In testimony whereof I affix my signature, in the presence of two witnesses.

GUSTAVE A. UNGAR.

Witnesses:
J. W. ANDERSON,
LAURA E. SMITH.